Aug. 11, 1942.  F. B. CHAPMAN  2,292,613
RETRACTABLE AIRPLANE WING
Filed Dec. 30, 1940  3 Sheets-Sheet 2
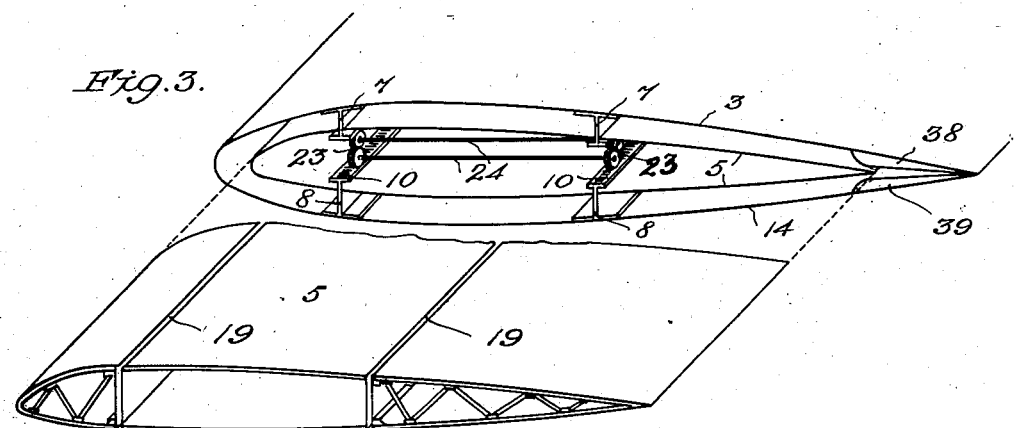
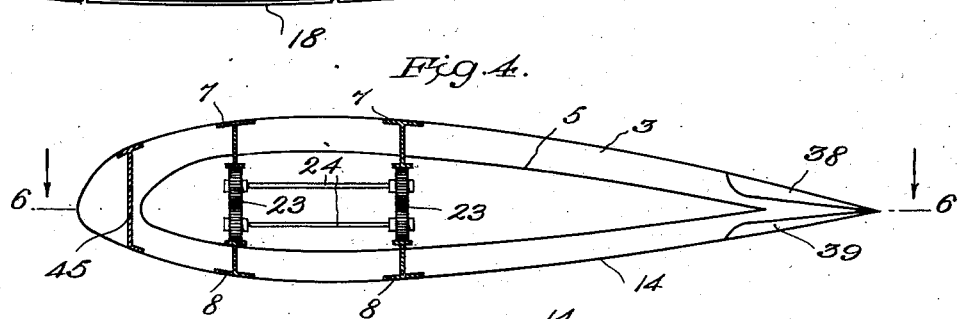
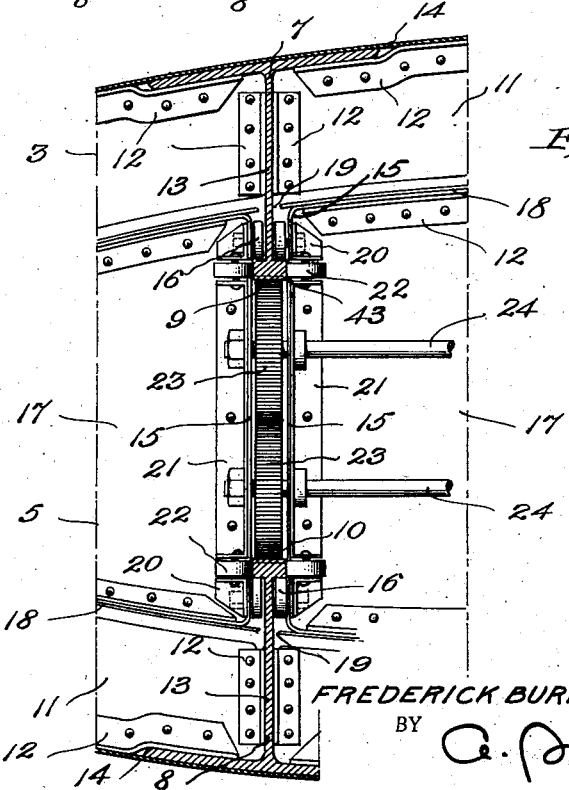
INVENTOR.
FREDERICK BURNHAM CHAPMAN
BY
ATTORNEY Aug. 11, 1942.   F. B. CHAPMAN   2,292,613
RETRACTABLE AIRPLANE WING
Filed Dec. 30, 1940   3 Sheets-Sheet 3
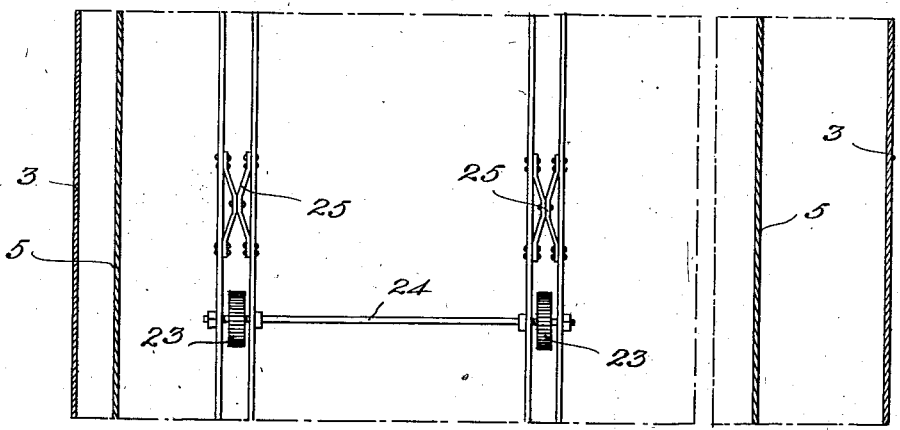
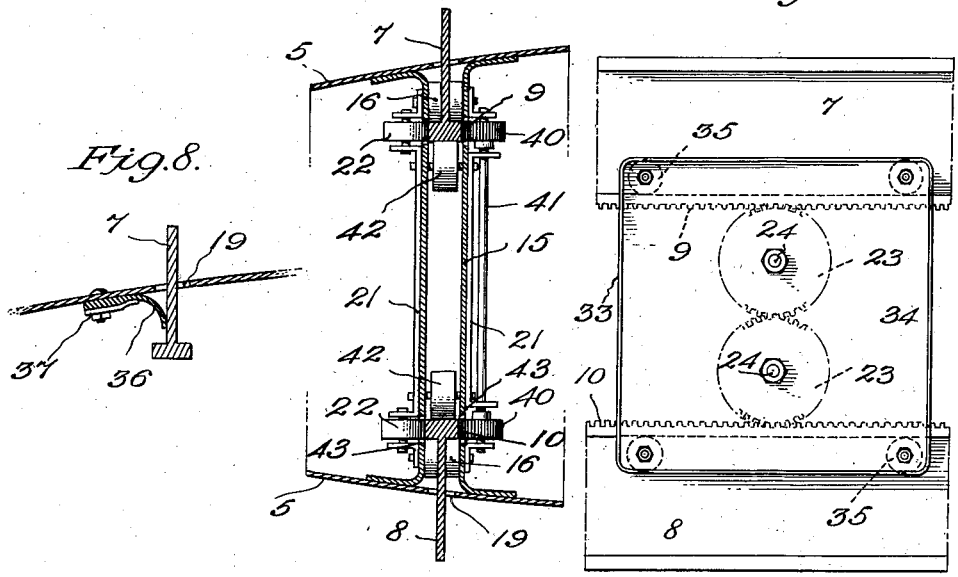
INVENTOR.
FREDERICK BURNHAM CHAPMAN
BY
ATTORNEY Patented Aug. 11, 1942

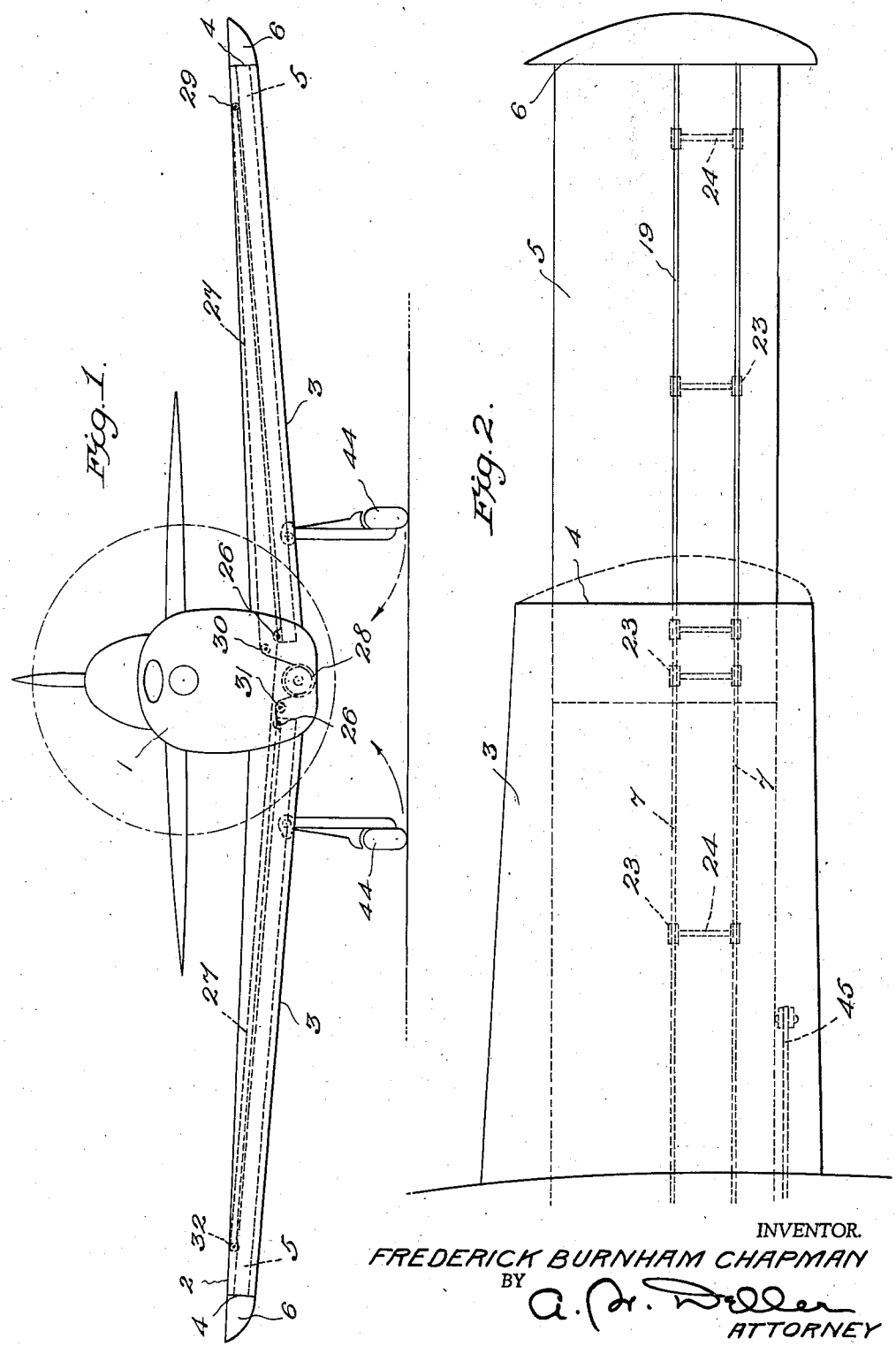

2,292,613

UNITED STATES PATENT OFFICE 2,292,613

RETRACTIBLE AIRPLANE WING

Frederick Burnham Chapman, Syosset, N. Y.

Application December 30, 1940, Serial No. 372,261

11 Claims. (Cl. 244—43)

The present invention relates to airplanes and, more particularly, to a wing construction therefor, and especially to retractible airplane wings.

The airplane art has long recognized the necessity for providing airplanes of greater wing spread where low speeds are desirable, as, for example, in decreased speeds for greater safety in taking off and landing. Longer wings are also of value where the airplane is to be heavily burdened, as with heavy freight or with large cargoes of fuel for long range flights. On the other hand, long wings are a distinct disadvantage in attaining high speeds, as, beyond a certain point, they act as a drag upon the airplane.

Attempts were made by the prior art to achieve the advantages of both long wings for lower speeds and greater support and of shorter wings for higher speeds by providing variable wing surfaces. Heinrich, in his U. S. Patents Nos. 1,438,957 and 1,558,089, disclosed telescopic wing structures comprising rollers or bearing means in the main wing member which were adapted to be slidingly engaged by the edges of the auxiliary wing member. This structure, however, provided no internal support for the main wing member when the auxiliary member was extended, so that this construction was not strong enough to provide a margin of safety against the tendency of the wing to collapse. In the wing structure described in the Salisbury patent (U. S. No. 1,764,122), part of the wing spars could be uncovered when the plane was in flight and a high speed was desired, such uncovered sections being adjacent to the fuselage. When taking off or when landing, movable cover sections were moved inwardly to furnish a skin for the uncovered spars, and anti-friction rollers journalled upon the wing spars engaged the inner surfaces of these movable cover sections. The presence of even the uncovered spars was enough to diminish considerably the speed of any aircraft equipped with the Salisbury structure. It will be appreciated that the presence of these naked spars would not only eliminate all possibility of streamlining, but would cause stresses due to the turbulence of the air passing through this structure. A further disadvantage resulting from this construction was the effect of having four wing tips (one at each end of each fixed wing member) while flying with the spars uncovered. This greatly reduced the effective aspect ratio, decreasing the lift of the wing.

U. S. Patent No. 2,076,059 to Asbury described a retractible wing in which the auxiliary member, when not in use for extending the wing spread, was employed for bracing the main wing member. Asbury gave a measure of support to the fixed member, even when the auxiliary member was in use. This was accomplished by providing frame braces which replaced the auxiliary wing structure as an internal support for the main wing member. These frame braces were hinged at their top edges and could be locked in vertical position to brace the ribs, while being capable of displacement upward to the horizontal plane upon retraction of the auxiliary wing member. The difficulty encountered with the Asbury wing was that it was not adapted to compensate for, or to furnish any support against, a shear stress. Thus, where the upper and lower spars of the wing were subjected to equal and opposite forces in a longitudinal direction, the frame braces, having no appreciable dimensions in the longitudinal direction of the wing and being adapted only for a straight compressive load, tilted over in response to the shear stress and permitted the wing to collapse.

Nothing that has been said herein is to be taken as in detraction of the prior art devices and structures, but rather as an indication of the difficulty of the problem which presented itself to the aircraft art. Although many attempts and proposals were made to solve this problem, none, so far as I am aware, proved to be wholly satisfactory, especially when attempted upon a commercial and industrial scale.

I have found that the difficulties encountered by the prior art can be overcome in a relatively simple manner.

It is an object of the present invention to provide an airplane having a variable lifting surface whereby an airplane with a wide range of flying speeds is provided.

It is another object of this invention to provide an improved airplane wing adapted for extension or retraction of a part thereof, whereby a wing of variable length is provided.

It is also an object of the invention to incorporate in airplanes, sustaining members of variable surface whereby greater range of lifting power can be obtained.

It is a further object of my invention to provide an airplane wing of telescopic construction wherein the main or fixed wing member is internally supported by the structure of the auxiliary wing member while in retracted position.

My invention also provides an airplane wing of telescopic construction wherein the main or fixed wing member is internally supported against both compressive and shear stresses even when the auxiliary member is in extended position, thereby providing a wing which can be lengthened for greater carrying capacity or lower speeds without danger of collapse.

The invention also contemplates the provision of a retractible airplane wing wherein the upper and lower spars of the main or fixed wing member are adapted to intersect the skin of the auxiliary wing member and wherein means mounted in said auxiliary member are adapted to maintain said spars in substantially the same relative position, thereby providing greater structural rigidity of the wing whereby danger of collapse is avoided.

It is also within the contemplation of my invention to incorporate in a retractible airplane wing of telescopic construction, an auxiliary wing member having a slotted skin to receive the spars of the main wing member when retracted and having means for closing said slots when extended.

The present invention further provides an airplane which for a given load capacity can, by retraction of its wings, be stored in a relatively limited space.

Other objects and advantages will be apparent from a description of a preferred embodiment of my invention taken in conjunction with the accompanying drawings, in which:

Fig. 1 is a diagrammatic vertical section of an airplane equipped with an embodiment of my retractible wing construction, showing a means for retraction;

Fig. 2 depicts a diagrammatic sectional plan view of an embodiment of my invention in extended position, showing an extra set of tie-in gears;

Fig. 3 illustrates a perspective view of a portion of a retractible airplane wing in accordance with the present invention, said wing being partly extended and broken away to show the interior diagrammatically;

Fig. 4 shows a diagrammatic cross sectional view of a preferred embodiment of my retractible wing with one surface withdrawn into the other;

Fig. 5 is a detail of Fig. 4, showing the cross section at one vertical support;

Fig. 6 depicts a fragmentary sectional plan view, taken on line 6—6 of Fig. 4;

Fig. 7 illustrates a fragmentary longitudinal sectional view of the wing, showing an extra set of tie-in gears;

Fig. 8 is a further detailed cross section of the auxiliary wing member of my device, showing the slotted skin thereof and a preferred closure means; and Fig. 9 depicts a view similar to Fig. 4 but showing an additional modification of my invention.

Broadly stated, my telescopic wing construction comprises a main or outer wing member fixedly attached to the fuselage of an airplane, and an auxiliary or inner wing member extensible from or retractible into the main member or section for the purpose of lengthening or shortening the wing spread. The auxiliary section is not completely retractible into the main wing member, so that the tip of the auxiliary section remains as the tip of the wing, whether extended or retracted. The skin of my auxiliary wing member is slotted for that portion of its length which is adapted to be withdrawn into the fixed member, and the upper and lower longitudinal beams or spars of the main section are of sufficient depth to intersect the skin of the auxiliary member at this slot. The spars of the main wing are toothed to form a rack, and gears or other engaging means are rotatably mounted in longitudinally fixed position upon the inside of the auxiliary wing section and are adapted to engage with the rack. The gears so mounted are arranged in cooperative position with respect to each other, and preferably in vertical pairs. The upper gear of each pair engages with the rack on one of the upper spars of the main wing member and also with the lower gear of the pair; this lower gear in turn engages with the rack on a lower spar of the main wing member. It is preferred to connect each pair of gears to the pair laterally across from them on the other spars by keying the upper gears to the same rotatable shaft and similarly keying the lower gears to a common shaft. This preferred construction is equally adaptable where more than two pairs of spars are employed in the main wing member. Means are provided for extending or retracting the auxiliary section, and it will be appreciated that the gears in each pair of gears within the auxiliary section will turn in counter-direction to each other and will move along the racks upon the upper and lower spars in unison.

An extra set of tie-in gears is provided which is not fixed to the auxiliary member. This extra set of gears preferably consists of two vertical pairs laterally across from each other upon a carriage and adapted to engage the upper and lower spars of the main section, the upper gears in each pair being keyed to the same shaft and the lower gears being likewise keyed to a common shaft. Means separate from the extending and retracting means of the auxiliary member are provided for causing the carriage bearing the extra set of gears to advance and retreat along the spars a distance proportional, say about one-half, to the travel of the auxiliary member. Additional sets of extra tie-in gears may be provided, if desired, and it will be appreciated that these gears are adapted to support the structure of the main wing section when the auxiliary member is extended. Those skilled in the art will understand that some of the bending stress will go around the skin and ends of the main section, so that the gears need not bear the entire load.

The main wing member is also supported against any shear stress. The effect of a shear stress would be to move the upper and lower spars in opposite longitudinal directions. In order to permit such movement, the gears in each set would have to rotate in the same direction. Since the gears engage with each other, as well as with the racks on the respective spars, they are not adapted to rotate in the same direction but must turn in counter-direction to each other. Moreover, when employing my preferred modification, the mounting of gears laterally across from each other upon a common shaft supports the wing against the possibility of a shear stress moving the leading edge spars and the trailing edge spars in opposite longitudinal directions.

The gears within the auxiliary wing member are mounted upon a webbing, and this webbing also serves to furnish lateral support for the spars of the main wing section and to keep them in alignment. Rollers or other friction-reducing means are preferably provided to facilitate the extension and retraction of the auxiliary section. I also prefer to provide closure means for the slot in the skin of the auxiliary member for the purpose of increasing the efficiency of the wing surface.

Referring to the figures in the drawings, wherein like reference characters designate similar parts throughout, I have indicated a fuselage of a monoplane by numeral 1. A wing 2 is provided upon each side thereof, the main section 3 of said wing being suitably attached to the fuselage. The main wing section has a port 4 at its end, and an auxiliary wing member 5 is mounted therein and adapted for longitudinal movement. At the end of the auxiliary member, a wing tip 6 is provided.

My novel construction can best be seen from a reference to Figs. 4, 5 and 6. Two upper longitudinal beams or spars 7 of rail section are provided in each wing, and I prefer that these spars be long enough to pass through the fuselage and serve in both wings for increased strength. Similarly, I provide two lower spars 8 of like construction, substantially in vertical alignment with the respective upper spars. The narrower flanges or rail heads of each pair of upper and lower spars face each other and are toothed, forming upper and lower racks 9 and 10, respectively. A framework made of conventional materials of construction, such as aluminum alloy, wood, or plastics, and of conventional design is employed within the main wing section, transverse webs 11 being atached by angles 12 to the web 13 of the spars at intervals along their length. Other similar angles are riveted or otherwise attached to the upper edge of the web 11, and the skin of the main wing section 14 is mounted upon these angles. The webs 11 are narrower than the depth of the spars and extend only from the broader flange thereof to a point upon its web 13 which is considerably short of the head.

My auxiliary wing member 5 is of cross section adaptable to be included within the innermost edges of webs 11 of the main wing member. The auxiliary section comprises pairs of vertical longitudinal webs 15 which are slideably mounted upon the heads of the spars 7 and 8. I prefer to provide rollers 16 at intervals along the length of web 15 for slidingly engaging the underside of the rail heads of the spars. As shown in detail in Fig. 5, vertical transverse webs 17 are attached to the longitudinal webs 15 at intervals upon their length by angles 12, and other angles 12 are mounted around the periphery of webs 17. A skin 18 of the auxiliary wing is supported by these peripheral angles. The skin 18 of the auxiliary section is provided with slots 19 slightly larger than the thickness of web 13 of the spars 7 and 8, and the skin is adapted to slide over these spars. Brackets 20 are attached to the transverse webs 17, and rollers 16 are rotatably mounted upon these brackets and are adapted for sliding engagement with the rear faces or underside of the narrow flange or head on each spar. Similarly, channels 21 are secured to the outside surface of each longitudinal web, and rollers 22 are rotatably mounted upon these channels and slidingly engage with the sides of the heads of spars 7 and 8 through apertures 43 in the webs 15 adjacent these rollers.

For the purpose of supporting my wing construction against compressive and shear stresses, I provide gears or pinions 23 of metal or, for lightness, of plastic material, which are mounted in vertical chains between the webs 15 in each pair of longitudinal webs and at intervals therealong. As shown in Fig. 5, each chain of gears may consist of two gears engaging each other in vertical alignment, the top gear also engaging with rack 9 on the face of the head of spar 7 and the bottom gear engaging with rack 10 on the face of the head of spar 8. Each chain of gears engaging the spars adjacent the leading edge of the wing is in transverse alignment with a chain of gears engaging the trailing edge spars, and each pair of chains laterally across from each other forms a set of gears. The upper gears of the set are keyed to a shaft 24 to make the two chains rotate together, and the lower gears are similarly connected by a common shaft 24 to aid and strengthen the same purpose. Between the webs in each pair of longitudinal webs, struts 25 are riveted between the chains of gears for the purpose of strengthening the structure.

Referring to Fig. 1, a method for extending and retracting the auxiliary member is diagrammatically presented. A lug 26 is located at the inner end of the auxiliary member 5 of each wing, and a cable 27 passes in "figure-eight" fashion from these lugs and around a motor-driven drum 28. One part of the cable is attached to one lug 26 and passes up and around a pulley 29 which is located at a point in the structure of the main wing member corresponding to approximately the position of the inner end of the auxiliary section when the wing is fully extended. The cable then passes into the fuselage, where it goes down over a pulley 30 and around the drum 28, traveling over a pulley 31 on the other side of the drum. From this point, it passes out to lug 26 on the opposite wing, where it is secured. Another part of cable 27 is also attached to this same lug 26 and passes over a pulley 32 corresponding in location to pulley 29 in the first wing. The cable then passes directly through the fuselage and is attached to lug 26 in said first wing. It will be evident from this description that, when the drum 28 is turned in a clock-wise direction, the auxiliary members will be moved into a further extended position, sliding out of ports 4. On the other hand, when the drum is rotated in a counter-clockwise direction, the auxiliary wing members will be pulled toward the fuselage and will be retracted.

I prefer to furnish one or more extra sets of tie-in gears for supporting the main wing section when the auxiliary wing has been extended. Referring to Fig. 7, a carriage 33 is provided upon which the extra set of gears is rotatably mounted. It comprises a pair of plates 34, and a chain, preferably a pair, of vertically aligned gears or pinions 23 is mounted upon each plate. The gears in each pair of gears engage with each other and, respectively, with the upper and lower racks 9 and 10. The upper gears in each pair of gears in the set are in transverse alignment with respect to the wing member and preferably turn upon a common shaft 24 which is journalled in the two plates 34. Similarly, the lower gears in the two pairs of gears are also preferably connected by a common shaft 24 journalled in the plates 34. In this manner, the extra set of gears is adapted to move along the pairs of upper and lower spars of the main wing section. Rollers 35 are also mounted upon plates 34 and are adapted slideably to engage one underside or rear face of the head of spars 7 and 8. Conventional means for advancing and retiring the extra set of gears, similar to the means described for extending and retracting the auxiliary wing member, are provided. The outer pulleys corresponding to pulleys 29 and 32, however, are placed at about half the distance from the fuselage, so that the extra set of gears will travel only about half as far as the auxiliary section of the wing. Thus, when the wing is in retracted position, the extra set of gears is located within the main wing member about halfway between the fuselage and the inner end of the auxiliary wing section; and, when the auxiliary member is fully extended, this same relative position is maintained, so that the extra set of gears has moved to a supporting position approximately midway between the fuselage and the inner end of the auxiliary section. Control means for advancing the extra set of gears coincidentally with the extension of the auxiliary member are preferably provided.

It is preferred to provide a means for closing the slots 19 when the auxiliary wing member is in extended position. I prefer to employ a sheet of rubber 36 horizontally attached to one side of the slot by a series of cleats 37 (see Fig. 8) and running the entire length of the slot. The rubber sheet is slightly larger than the slot and is adapted to cover the same. It should be sufficiently resilient so that it will assume a proper position as soon as the slot is free of the spar in the main wing member. It is preferred that the sheets of rubber for the upper slots in the skin be located within the wing member and that the sheets of rubber designed to close the lower slots be outside the surface of the wing member. Thus, each sheet of rubber is bent in a downward position by the spars of the main wing section, whether the spars be upper or lower. It will be appreciated that, with the rubber sheets in these positions, the vacuum formed above the upper skin of the wing will tend to draw the sheet up and keep the upper slots closed when the auxiliary member is extended, while the pressure on the lower skin of the wing will similarly close the bottom slots.

The operation of my improved wing structure is extremely simple. It will be apparent to those skilled in the art that the auxiliary members of the two wings can be operated simultaneously and that the wings can be lengthened or shortened at the will and discretion of the pilot.

Although my invention has been described with respect to use upon a monoplane, those skilled in the art will appreciate that it is equally adaptable to biplanes, etc. as well. Moreover, it can be used in high-wing, mid-wing or low-wing construction. Indeed, it is adaptable to any surface which serves an aerodynamic purpose.

It is to be observed that the air foils of the main wing member are preferably designed to stall at a greater angle of attack than the air foils of the auxiliary section, so that the main section stalls last. Thus, as an example, air foils NACA 23009, stalling at about a 21° angle of attack can be employed for the movable member, and air foils NACA 23015, stalling at about a 23½° angle of attack, would then be suitable for the fixed section. This is desirable, as the control surfaces are most conveniently located upon the main member.

Referring to Fig. 4, an up-movement aileron 38 is employed in my preferred modification, but those skilled in the art will appreciate that other devices for lateral control, such as down-movement ailerons, full-movement ailerons, spoilers etc., can be substituted therefor. A flap 39 is also provided, and it will also be appreciated that flaps can be used with any type of aileron.

Although the present invention has been described in connection with a preferred embodiment, variations and modifications may be resorted to, as those skilled in the art will understand. Thus, instead of providing chains of intermeshing gears which respectively engage racks upon the face of the head of the spars in my main wing member, I can employ pairs of parallel gears connected to each other by the same shaft and engaging with racks upon the sides of the heads of the upper and lower spars. Such a modification is illustrated at Fig. 9, where horizontal gears or pinions 40 are connected to each other by means of a common vertical shaft 41 which is journalled in the flanges of a channel 21 attached to the transverse web 17. As shown in Fig. 9, racks 9 and 10 are located along the sides of the heads of spars 7 and 8. In this modification, only a single side of each spar's rail head carries a rack, but it will be understood that pairs of parallel gears can be employed upon both sides of the head in a similar manner. Vertical rollers 42 are mounted between the pair of vertical longitudinal webs 15 employed in association with each pair of spars, adjacent the faces of the spar heads and in contact therewith, and these webs are also provided with apertures 43, the web upon the toothed side of the spars having said apertures adjacent the pinions 40 for the purpose of allowing the pinions to engage with the racks. Similarly, the web upon the opposite side of the spars has apertures adjacent the rollers 22 to permit them to contact with said spars. It will be understood that any arrangement of toothed or cogged members, including series or chains of gears, pinions, racks, and cog wheels, as well as sprocket connections, or other engaging means, such as friction rolls, could readily be adapted to serve my general purpose of maintaining vertically aligned portions of the upper and lower spars in substantially the same relative position to each other to resist shear stresses.

It will also be understood that various details of design and construction can be considerably changed and revised, as those skilled in the airplane art may desire, without interfering with the principles of my invention. For example, although I have described a web type of construction throughout, a truss structure, as indicated in Fig. 3, would be equally applicable. Furthermore, while my invention has been described in connection with two pairs of spars, a larger number, such as four, could also be suitably employed. It may also be desired to substitute zippers as the closure means for the slots in my auxiliary wing member instead of the rubber sheets herein provided.

It will be observed, at Fig. 1, that I have shown a suitable landing gear for use with my improved wing, wherein the wheels 44 depend from the wings 2 and are adapted to be swung up into a suitable chamber in the fuselage 1, when not in use. This landing gear is preferably carried by an auxiliary spar 45 passing through the fuselage and located in front of the auxiliary member in the main wing section. While I prefer to use a landing gear of this type, it will be appreciated that the same is not part of my invention and that any other landing gear which could be adapted to be used with my wing could readily be substituted therefor.

Similarly, while I have stated that additional extra sets of tie-in gears can be employed in my improved wing for internally supporting the main wing section during the extension of the auxiliary member, those skilled in the art may find it desirable, depending upon the maximum amount of extension possible, to replace these additional extra sets of gears by a somewhat different design of spar. Thus, the upper spar, which is normally in compression, may be made of increasing cross section in going toward the fuselage; the lower spar, normally in tension, needs no greater width. These and other variations and modifications are considered to be within the scope of the present specification and the purview of the appended claims.

I claim:

1. An airplane wing comprising a main wing section having an interior space extending longitudinally thereof and a port in the end thereof, a plurality of spars having a head portion and arranged in vertically aligned pairs extending longitudinally of said section, said head portion projecting into said interior space, racks upon said head portions of said spars, an auxiliary wing section having a slotted skin adapted to receive the head portions of the spars and slidably mounted thereupon within said interior space, said auxiliary section being adapted to extend laterally through said port and beyond said main section, means for extending and retracting said auxiliary section to provide a wing of variable length, rollers mounted upon said auxiliary section adjacent to said spars to facilitate said extension and retraction, and gears mounted within said auxiliary section to engage with the racks upon the head portions of the spars to maintain said spars in substantially the same relative position to each other, thereby providing an airplane having retractible wings of great structural rigidity whereby wide ranges of flying speeds and lifting power can be attained without danger of collapse.

2. An airplane wing comprising a main wing section having an interior space extending longitudinally thereof and a port in the end thereof, a plurality of spars having a head portion and arranged in vertically aligned pairs extending longitudinally of said section, said head portion projecting into said interior space, racks upon the faces of the head portions of the spars, an auxiliary wing section having a skin and slidably mounted upon said spars within said interior space, said auxiliary section being adapted to extend laterally through said port and beyond said main section, slots in the skin of said auxiliary section adapted to receive the head portions of the spars, means for extending and retracting said auxiliary section to provide a wing of variable length, rollers mounted upon the auxiliary section adjacent the spars and adapted to make rolling contact therewith to facilitate said extention and retraction, and substantially vertical chains of gears mounted within said auxiliary section to engage with the racks upon the faces of said spar heads to maintain said spars in substantially the same relative position to each other, thereby providing an airplane having retractible wings of great structural rigidity whereby wide ranges of flying speeds and lifting power can be attained without danger of collapse.

3. An airplane wing comprising a main wing section having an interior space extending longitudinally thereof and a port in the end thereof, a plurality of spars having a head portion and arranged in vertically aligned pairs extending longitudinally of said section, said head portion projecting into said interior space, racks upon the faces of the head portions of the spars, an auxiliary wing section having a skin and slidably mounted upon said spars within said interior space, said auxiliary section being adapted to extend laterally through said port and beyond said main section, slots in the skin of said auxiliary section adapted to receive the head portions of the spars, means for extending and retracting said auxiliary section to provide a wing of variable length, rollers mounted upon the auxiliary section adjacent the spars and adapted to make rolling contact therewith to facilitate said extension and retraction, substantially vertical chains of gears mounted within said auxiliary section and arranged in sets transversely thereto, and substantially horizontal rotatable shafts connecting the gears in transverse alignment and keyed thereto, whereby the chains of gears in a set are made to rotate together, thereby providing an airplane having retractible wings of great structural rigidity whereby wide ranges of flying speeds and lifting power can be attained without danger of collapse.

4. An airplane wing comprising a main wing section having an interior space extending longitudinally thereof and a port in the end thereof, two substantially vertically aligned pairs of spars extending longitudinally of said section, each spar having a head portion projecting into said interior space, racks upon the faces of the head portions of the spars, an auxiliary wing section having a skin and slidably mounted upon said spars within said interior space, four slots in the skin of said auxiliary section adapted to receive the head portions of the spars, means for extending and retracting said auxiliary section to provide a wing of variable length, rollers mounted upon the auxiliary section adjacent the spars and adapted to make rolling contact therewith to facilitate said extension and retraction, gears arranged in substantially vertical pairs mounted within said auxiliary section and arranged in sets of two pairs of gears aligned transversely to said auxiliary section, said gears being adapted to engage the racks upon the faces of said spar heads to maintain said spars in substantially the same relative positon to each other, and substantially horizontal rotatable shafts connecting the gears in transverse alignment and keyed thereto whereby the pairs of gears in a set are made to rotate together, thereby providing an airplane having retractible wings of great structural rigidity whereby wide ranges of flying speeds and lifting power can be attained without danger of collapse.

5. An airplane wing comprising a main wing section having an interior space extending longitudinally thereof and a port in the end thereof, a plurality of spars having a head portion and arranged in vertically aligned pairs extending longitudinally of said section, racks upon at least one side of said head portion, an auxiliary wing section having a skin and slidably mounted upon said spars within said interior space, said auxiliary section being adapted to extend laterally through said port and beyond said main section, slots in said skin adapted to receive the head portions of the spars, means for extending and retracting said auxiliary section to provide a wing of variable length, rollers mounted upon the auxiliary section adjacent the spars and adapted to make rolling contact therewith to facilitate said extension and retraction, substantially horizontal gears mounted in substantially vertically aligned pairs within said auxiliary section and adapted to engage the racks upon the sides of said spar heads, and a substantially vertical shaft connecting each pair of vertically aligned horizontal gears to make said gears rotate together and to maintain said spars in substantially the same relative position to each other, thereby providing an airplane having retractible wings of great structural rigidity whereby wide ranges of flying speeds and lifting power can be attained without danger of collapse.

6. An airplane wing comprising a main wing section having an interior space extending longitudinally thereof and a port in the end thereof, a plurality of spars having a head portion and arranged in vertically aligned pairs extending longitudinally of said section, said head portion projecting into said interior space, racks upon said head portions of said spars, an auxiliary wing section having a slotted skin adapted to receive the head portions of the spars and slidably mounted thereupon within said interior space, said auxiliary section being adapted to extend laterally through said port and beyond said main section, means for extending and retracting said auxiliary section to provide a wing of variable length, rollers mounted upon said auxiliary section adjacent to said spars to facilitate said extension and retraction, gears mounted within said auxiliary section to engage with the racks upon the head portions of the spars to maintain said spars in substantially the same relative position to each other, tie-in gears adapted to engage said racks mounted within the main wing section and movable longitudinally thereof, and means for advancing and withdrawing said tie-in gears along the spars to provide internal support against both compressive and shear stresses even when the auxiliary section is in an extended position, thereby providing an airplane having retractible wings of great structural rigidity whereby wide ranges of flying speeds and lifting power can be attained without danger of collapse.

7. An airplane wing comprising a main wing section having an interior space extending longitudinally thereof and a port in the end thereof, a plurality of spars having a head portion and arranged in vertically aligned pairs extending longitudinally of said section, said head portion projecting into said interior space, racks upon the faces of the head portions of the spars, an auxiliary wing section having a skin and slidably mounted upon said spars within said interior space, said auxiliary section being adapted to extend laterally through said port and beyond said main section, slots in the skin of said auxiliary section adapted to receive the head portions of the spars, means for extending and retracting said auxiliary section to provide a wing of variable length, rollers mounted upon the auxiliary section adjacent the spars and adapted to make rolling contact therewith to facilitate said extension and retraction, substantially vertical chains of gears mounted within said auxiliary section to engage with the racks upon the faces of said spar heads to maintain said spars in substantially the same relative position to each other, substantially vertical chains of tie-in gears adapted to engage said racks mounted within the main wing section and movable longitudinally thereof, and means for advancing and withdrawing said chains of tie-in gears along the spars a distance proportional to the movement therealong of the auxiliary section to provide internal support against both compressive and shear stresses even when the auxiliary section is in an extended position, thereby providing an airplane having retractible wings of great structural rigidity whereby wide ranges of flying speeds and lifting power can be attained without danger of collapse.

8. An airplane wing comprising a main wing section having an interior space extending longitudinally thereof and a port in the end thereof, two substantially vertically aligned pairs of spars extending longitudinally of said section, each spar having a head portion projecting into said interior space, racks upon the faces of the head portions of the spars, an auxiliary wing section having a skin and slidably mounted upon said spars within said interior space, four slots in the skin of said auxiliary section adapted to receive the head portions of the spars, means for extending and retracting said auxiliary section to provide a wing of variable length, rollers mounted upon the auxiliary section adjacent the spars and adapted to make rolling contact therewith to facilitate said extension and retraction, gears arranged in substantially vertical pairs mounted within said auxiliary section and arranged in sets of two pairs of gears aligned transversely to said auxiliary section, said gears being adapted to engage the racks upon the faces of said spar heads to maintain said spars in substantially the same relative position to each other, two substantially horizontal rotatable shafts connecting the gears in transverse alignment in each set and keyed thereto whereby the pairs of gears in a set are made to rotate together, at least one set of two pairs of tie-in gears adapted to engage said racks mounted within the main wing section in alignment transversely thereto and movable longitudinally thereof, two substantially horizontal rotatable shafts connecting the tie-in gears in transverse alignment in each set and keyed thereto whereby the pairs of tie-in gears in a set are made to rotate together, and means for advancing and withdrawing said chains of tie-in gears along the spars a distance proportional to the movement therealong of the auxiliary section to provide internal support against both compressive and shear stresses even when the auxiliary section is in an extended position, thereby providing an airplane having retractible wings of great structural rigidity whereby wide ranges of flying speeds and lifting power can be attained without danger of collapse.

9. The combination set forth in claim 1 wherein is provided closure means associated with said auxiliary wing section for covering the slotted portions of the skin thereof when said auxiliary section is in an extended position whereby an improved lifting surface is provided.

10. The combination set forth in claim 2 wherein is provided resilient closure means secured to the auxiliary wing section and adapted for covering the slots in the skin thereof when said auxiliary section is in an extended position whereby an improved lifting surface is provided.

11. An airplane wing comprising in combination a main wing section having an interior space extending longitudinally thereof and a port in the end thereof, a plurality of spars arranged in vertically aligned pairs extending longitudinally of said section, each having a head portion with a rack thereon projecting into said interior space, an auxiliary wing section having a slotted skin adapted to receive the head portions of the spars and slidably mounted thereupon within said interior space, said auxiliary section being adapted to be extended laterally through said port and beyond said main section to provide a wing of variable length, and a pair of vertically aligned mutually engaging gears interposed between corresponding pairs of said spars and in engagement with the racks thereon, said gears being displaceable along said spars when said auxiliary section is displaced with respect to said main section and being adapted to directly transfer lift loads from the bottom spar to the top spar of the aligned pair while positively preventing relative displacement of said spars with respect to each other.

FREDERICK BURNHAM CHAPMAN.